Patented Feb. 9, 1937

2,070,350

UNITED STATES PATENT OFFICE 2,070,350

MANUFACTURE OF COMPOUNDS USEFUL FOR PROTECTION AGAINST MOTHS

Jakob Bindler, Basel, Switzerland, assignor to the firm of "J. R. Geigy S. A." Basel, Switzerland No Drawing. Application July 27, 1933, Serial No. 682,530. In Switzerland July 13, 1933

7 Claims. (Cl. 260—47)

In specification of the U. S. patent application Ser. No. 682,531, filed July 27, 1933, is described a manufacture of a new class of isatin condensation products useful for protection against moths. The manufacture consists in condensing an isatin sulphonic acid with a derivative or homologues of phenol substituted in the nucleus by an alkyl-group having three or more carbon atoms, or by one or two halogen atoms, or simultaneously by both kinds of substituents.

According to the present invention, which is an improvement in or modification of that described in the aforesaid specification, compounds having a very good protective action against moths are also obtained by condensing, instead of an isatin sulphonic acid, an isatin sulphonic acid derivative of the general formula:

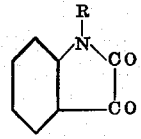

wherein R stands for a benzyl sulphonic acid or chlorobenzyl sulphonic acid radical, with a substituted phenolic body of the benzene series of the general formula:

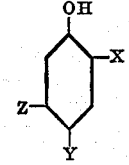

wherein X is one of the group consisting of hydrogen and lower alkyl, Y is one of the group consisting of hydrogen and amyl and Z is one of the group consisting of hydrogen and methyl, wherein at least one, but no more than two substituents are hydrogen and one of the three substituents contains at least three carbon atoms. Such condensation products are di-amylphenol-N-(benzyl-sulphonic acid)-isatin, di-thymol-N-(benzyl-sulphonic acid)-isatin, di-thymol-N-(chlorobenzyl-sulphonic acid)-isatin and so on. In order that the products may be soluble in water, either the condensation products, when insoluble, are sulphonated, or sulphonated components are used for the condensation.

The following examples illustrate the invention, the parts being by weight:—

Example 1

17 parts of N-(benzyl-sulphonic acid)-isatin and 15 parts of thymol having the formula:

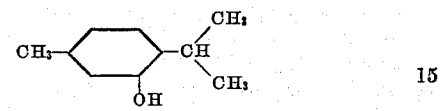

are dissolved in 50 parts of concentrated hydrochloric acid and there are then added in the cold 14 parts of stannic chloride as condensing agent. The whole is slowly heated to 100–110° C. and the reaction is allowed to continue for 3 hours at this temperature. After the reaction mixture has been allowed to cool, it is diluted with water and subjected to steam distillation until no more thymol passes over. The product is salted out by the addition of potassium chloride, purified by recrystallization, neutralized with potassium carbonate and again precipitated. The dried product is a white powder which is soluble in water. It has the following formula:

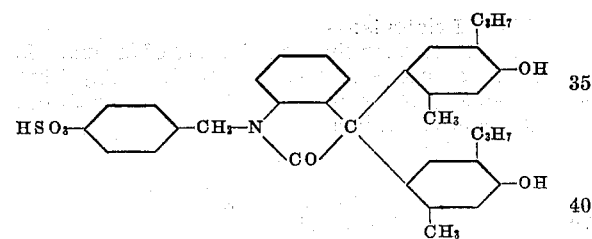

The reaction proceeds in the same manner when zinc chloride is used as the condensing agent.

The N-benzyl-isatin-sulphonic acid used in this example is made by direct sulphonation of N-benzyl-isatin in sulphuric acid monohydrate until a water soluble product is formed, the sulphonation mixture being worked up in the usual manner.

*Example 2*

17 parts of N-(benzyl-sulphonic acid)-isatin and 17 parts of amyl-phenol having the formula:

are dissolved in 50 parts of concentrated hydrochloric acid and there are then added in the cold 14 parts of stannic chloride as condensing agent. The reaction mixture is slowly heated to 100–110° C. and is maintained for 3 hours at this temperature. After cooling, the reaction mixture is worked up in the manner described in Example 1. The obtained product has the following formula:

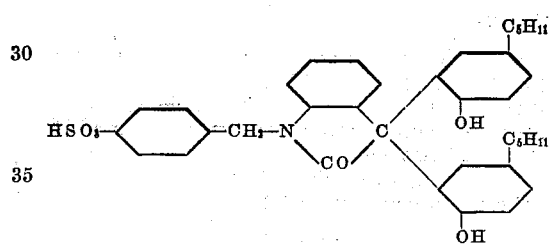

*Example 3*

18.5 parts of N-(ortho-chloro-benzyl sulphonic acid)-isatin and 15 parts of thymol are dissolved in 50 parts of concentrated hydrochloric acid and there are then added in the cold 14 parts of stannic chloride as condensing agent. The reaction mixture is slowly heated to 100–110° C. and is maintained for 3 hours at this temperature. After cooling, the reaction mixture is worked up in the manner described in Example 1. The obtained product has the following formula:

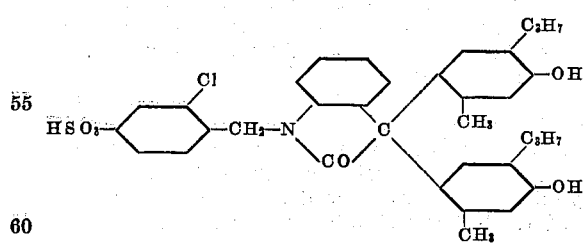

What I claim is:—

1. A process for the manufacture of compounds useful for protection against moths, comprising condensing an isatin sulphonic acid derivative of the general formula:

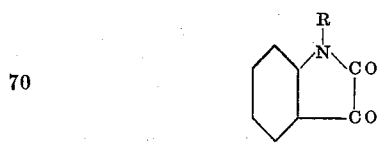

wherein R stands for a member of the group consisting of the monosulphonated benzyl and mono-sulphonated chlorobenzyl radicals, with a substituted phenolic body of the benzene series having the general formula:

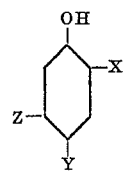

wherein X is one of the group consisting of hydrogen and lower alkyl, Y is one of the group consisting of hydrogen and amyl and Z is one of the group consisting of hydrogen and methyl, wherein at least one, but no more than two substituents are hydrogen and one of three substituents contains at least three carbon atoms.

2. A process for the manufacture of compounds useful for protection against moths, comprising condensing N-(benzyl-sulphonic acid)-isatin with a substituted phenolic body of the benzene series of the general formula:

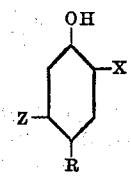

wherein X is one of the group consisting of hydrogen and lower alkyl, Y is one of the group consisting of hydrogen and amyl and Z is one of the group consisting of hydrogen and methyl, wherein at least one but, no more than two substituents are hyrogen and one of the three substituents contains at least three carbon atoms.

3. A process for the manufacture of compounds useful for protection against moths, comprising condensing N-(benzyl-sulphonic acid)-isatin with thymol.

4. A process for the manufacture of compounds useful for protection against moths, comprising condensing N-(benzyl-sulphonic acid)-isatin with amyl-phenol.

5. As compounds for protection against moths, the condensation products having the general formula:

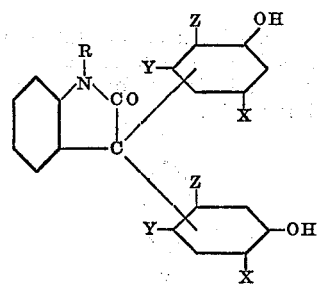

wherein R stands for a member of the group consisting of monosulphonated benzyl and monosulphonated chloro-benzyl radicals, and X is one of the group consisting of hydrogen and lower alkyl, Y is one of the group consisting of hydrogen and amyl and Z is one of the group consisting of hydrogen and methyl, wherein at least one, but no more than two substituents are hydrogen and one of the three substituents contains at least three carbon atoms.

6. As a compound for protection against moths, the condensation product having the formula:
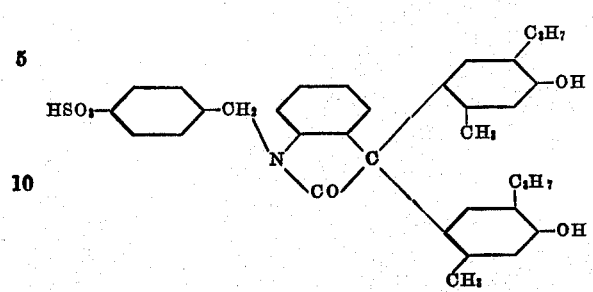
7. As a compound for protection against moths, the condensation product having the formula:
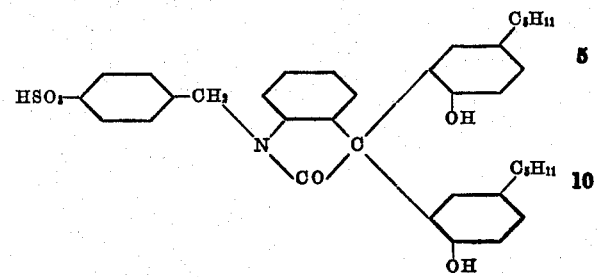
JAKOB BINDLER.